(No Model.)
J. H. WEHRLE.
CONDUIT FOR ELECTRIC RAILWAYS.
No. 431,633. Patented July 8, 1890.
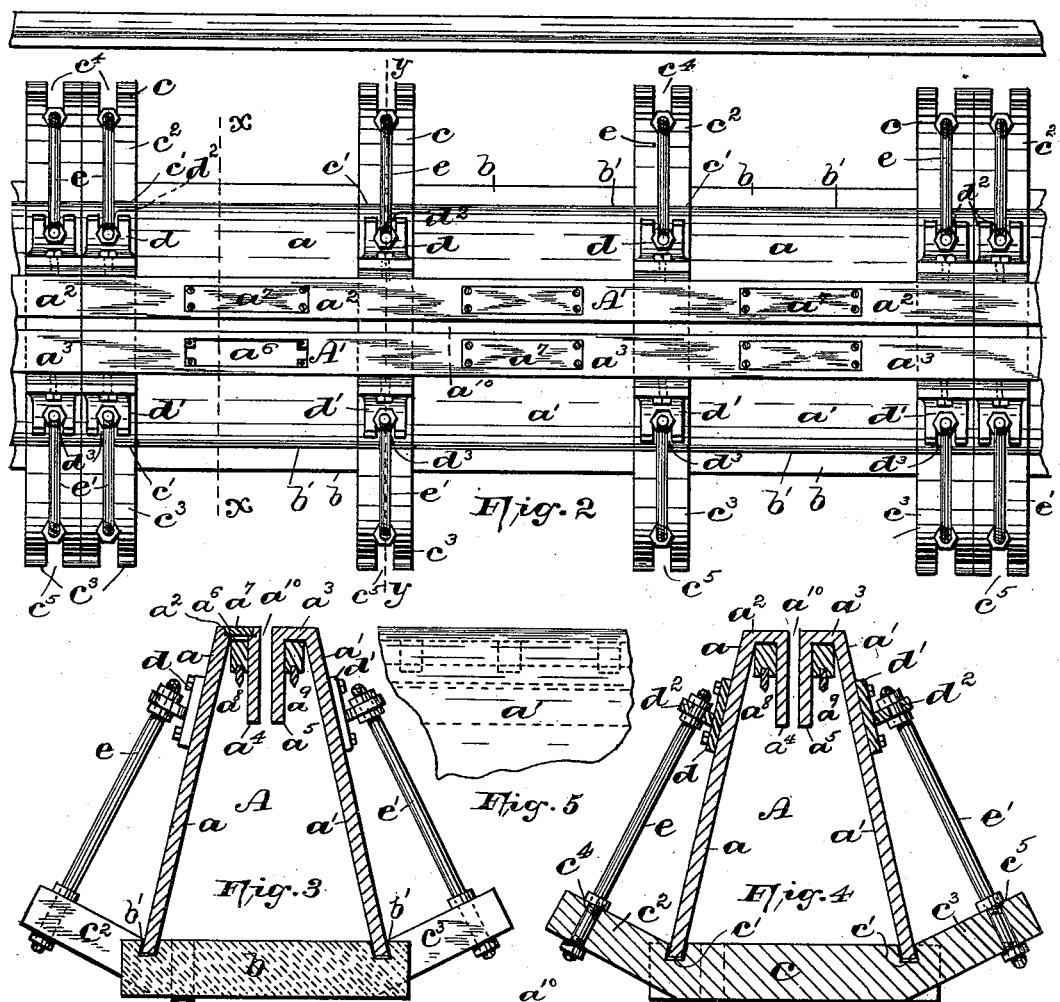
WITNESSES:
Herbert Boggs
Wm. H. Canfield
INVENTOR:
Joseph H. Wehrle
BY Fred'k C. Fraentzel, ATTY.

UNITED STATES PATENT OFFICE.

JOSEPH H. WEHRLE, OF NEWARK, NEW JERSEY.

CONDUIT FOR ELECTRIC RAILWAYS.

SPECIFICATION forming part of Letters Patent No. 431,633, dated July 8, 1890.

Application filed September 28, 1889. Serial No. 325,437. (No model.)

*To all whom it may concern:*

Be it known that I, JOSEPH H. WEHRLE, a citizen of the United States, residing at Newark, in the county of Essex and State of New Jersey, have invented certain new and useful Improvements in Conduits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The herein-described invention relates to new and useful improvements in conduits for the arrangement therein of electrical conductors or wires or cables; and the invention has for its object to provide a duct or conduit of such construction and combinations of parts or sections adapted to be secured end to end, and to provide a conduit the upper side of which sections are arranged to form a continuous slot or opening in the conduit.

Furthermore, the invention has for its further object to provide a conduit or duct, which is slotted or open at the top, and provided on each side of said slot in the interior of the conduit with downwardly-projecting flanges or walls, which serve for the purpose of leading any water down below the positions of the electrical conductors, and which flanges or walls form compartments or chambers on both sides of the slot within the conduit, and within which chambers the electrical conductors or wires are arranged in such manner in the upper part of the conduit so as to prevent any possibility of the rain and water which might pass down into the slot formed by the downwardly-projecting walls from coming in contact with the electrical conductors, and the latter are thereby kept constantly dry, and the electricity does not become lost due to the conductivity of the water or moisture.

To this end the present invention consists of the various arrangements and combinations of parts which will be hereinafter more fully described, and finally embodied in the clauses of the claims.

The invention further relates to improvements in conduits adapted to be located below the surface of the pavement or ground, whereby easy access is provided to the electrical conductors or cable in case of a break or other disturbance, and thus avoiding the tearing up of the street when it is necessary to undertake such repairs.

In the drawings herewith accompanying, in which similar reference-letters are employed to indicate corresponding parts in each of the several views, Figure 1 is a plan view of my improved conduit for electrical conductors or cables illustrating the conduit in place in the street between the rails upon which the cars or other vehicles are run. Fig. 2 represents a plan view of one of the sections comprising the conduit and illustrating the manner of securing the same to a bed of cement or other material by means of braces and tie-rods. Figs. 3 and 4 are vertical sections taken through lines $x$ and $y$, respectively, in Fig. 2. Fig. 5 represents a side elevation of a part of a conduit, and Fig. 6 shows one manner of securing the abutting ends of two adjoining sections to one another. Fig. 7 is a sectional view of the upper part of a conduit, illustrating a modified form of construction.

In carrying out my invention the ends of the sides of each section of the conduit are secured to each other in any well-known manner.

In the drawings, A indicates the conduit, which is arranged between the rails in the street or ground, and which consists of any number of adjoining sections A' A', according to the length of the road. The conduit consists of a bed or base-plate $b$, of cement or iron or any other suitable material, and is provided with longitudinal slots or grooves formed in the upper side of said base-plate, which grooves are lettered in the drawings $b'$ $b'$. Across said bed-plate $b$ at intervals equidistant are arranged braces $c$ $c$, as shown, which are also provided with grooves $c'$, arranged in such a manner in said braces so that the grooves $b'$ in the base and the grooves $c'$ in the braces form one continuous groove on each side of the base-plate, running parallel to each other and along the entire length of the bed in the road. Within said grooves are arranged at any desirable angle, the sides or plates $a$ and $a'$ of the sections A′ A′ comprising the conduit. These sections or plates are provided at their ends with any well-known means—such as a groove and tenon or tongue—which fit for insertion into each other, and thus prevent the sections from being forced out of their proper positions.

As will be seen from Figs. 3 and 4, the sides $a$ and $a'$ of each section are made of iron, either cast or rolled, and bent near their upper edges to form the sides $a^2$ and $a^3$ and then bent downwardly at a right angle or approximately so to form the projecting flanges or walls $a^4$ and $a^5$. These sides of each section are arranged in the grooves in the bed-plate in the manner as illustrated, so that the sides $a^2$ and $a^3$ are level with the grade of the street or road, and the downwardly-projecting flanges or walls $a^4$ and $a^5$ form a deep slot or passage-way $a^{10}$, through which a cable-grip is adapted to pass into the car, or through which, when used for supplying electricity to cars or other vehicles, an arm on a carriage or trolley extends down into the conduit and makes the connections with the electrical conductors or wires arranged therein, as will be understood, and which slot serves as a passage-way to conduct the water down into the bottom of the conduit and preventing the same from coming in contact with the electrical conductors. The braces $c$, as has been stated, are arranged in the bed-plate at any desirable intervals, and are provided with upwardly-extending arms $c^2$ and $c^3$ projecting on the opposite sides of the bed-plate. Any number of such braces may be employed to secure the sections in position in the bed or base plate. On the plates or sides $a$ and $a'$ near the tops thereof are placed or secured the angle-irons $d$ and $d'$, which are secured to the sides of the conduit in any convenient and well-known manner. Said angle-irons are perforated or slotted, as at $d^2$ and $d^3$, and within said perforations or slots are secured tie-rods $e$ and $e'$, which are similarly secured at their opposite ends in perforations or slots $c^4$ and $c^5$, formed in the oppositely-projecting arms or extensions $c^2$ and $c^3$. By means of said rods or tie-bolts $e$ and $e'$, which are provided at their ends with nuts, the strain on the angle-irons may be diminished or increased, so as to bring the plates or sides of each section of the conduit into their proper positions, and by means of which the width of the slot in the top of the conduit may be regulated.

Referring to Figs. 2 and 3, at the proper or necessary intervals openings $a^6$ may be formed in the sides $a^2$ and $a^3$, and covers $a^7$ arranged and secured in said openings, any one of which covers may be removed at any time in order to make the necessary repairs to the conductors or cable or to establish or locate the cause of a break in the line. The upper ends of the inner sides of the plates $a$ and $a'$, the sides $a^2$ and $a^3$, and the downwardly-projecting flanges or walls $a^4$ and $a^5$ form the chambers or compartments $a^8$ and $a^9$, which may be of any convenient width and length, and within which may be supported in any convenient manner the electrical conductors or wires, from which the electricity can be communicated to the desired point. The great advantage of this arrangement of the projecting flanges or walls $a^5$ and $a^6$ is that the conductors may be arranged within the chambers $a^8$ and $a^9$ free from any communication with water or moisture, the slot $a^{10}$, formed by the sides $a^5$ and $a^6$, being of sufficient depth to cause the water to pass beyond the reach of the electrical conductors and to pass down into the bottom of the conduit, and the bed-plate of which is connected by means of a pipe or pipes $f$ with the sewer.

The conduits are of sufficient depth, so that no matter how great a storm and how much water will pass down through the slot in the top of the conduit the water will not rise high enough to come in contact with the electrical conductors, being passed off through the sewer-connections $f$ with rapidity and without any danger to the conductor or wires becoming submerged in water.

From Figs. 3 and 4 it will be evident that a conductor is employed upon which I intend to run a carriage or trolley for communicating the electrical currents to the motor of a vehicle; but, as shown in Fig. 7, if desirable, said chambers or compartments $a^8$ and $a^9$ may be provided with perforated frames for supporting electric-light or other wires therein, while an ordinary cable and its mechanism may be arranged within the conduit below the wires or on the base or bed plate, as will be understood.

In making up the sections of the conduit of plates $a$ and $a'$ arranged on opposite sides on the top of the bed-plate in the longitudinal grooves therein and secured in position by means of tie-rods, I have attained this advantage over constructions as heretofore made, in that in case of any break or disturbance in the line and after the same has been located, I can very readily remove any one of the sides or plates of the sections without tearing up very much of the pavement, and further, which is of a still greater advantage, any plate may be removed after taking off the nuts on the tie-bolts without disturbing the position of the electrical conductors or necessitating the removal of the latter, and when used for the conveyance of motive power to cars or other vehicles the latter can be run over the point where repairs are being made without any trouble. In lieu of constructing a conduit in this manner, instead of employing a cement, base said base-plate and the sides $a$ and $a'$, &c., may be cast in one piece, the construction previously described, however, being the preferred form.

From the form of the construction shown it is evident that the conduit more especially adapts itself for use of communicating electric motive-power by means of conductors in the chambers or compartments $a^8$ and $a^9$ by means of a carriage or trolley to the motor in a car, the construction of which will be shown and claimed in an application to be filed later on.

The form and sizes of the chamber or compartments $a^8$ and $a^9$ may be varied without departing from the scope of the present invention, as I may prefer, in some instances, to arrange beside the conductor for communicating the electricity to the carriage or trolley other wires, such as electric-light wires, &c.

I do not wish to limit myself to the particular shape or form of the chambers $a^8$ and $a^9$ and the walls or flanges $a^5$ and $a^6$, one of the essential features of the invention being an open-slotted conduit provided with compartments formed in the top thereof, in which at all times the conductors will be free from dirt, water, or any other foreign substances.

I do not wish to limit my invention solely to conduits adapted to be used underground, as the same may be readily employed on elevated-railway structures to drive the cars by means of electricity, as will be understood.

Having thus described my invention, what I claim is—

1. A slotted conduit composed of abutting sections and each section being provided on its upper side with inwardly and downwardly projecting flanges or walls formed integrally therewith, which form continuous open-bottomed compartments or chambers in the top of said conduit and a slot between said chambers, and electrical conductors in said chambers arranged therein above the lowest part of said flanges and forming a complete metallic circuit and continuous rails through the entire length of the conduit, for the purposes set forth.

2. A conduit made up of abutting sections forming a continuous open top or slot and provided with inwardly and downwardly projecting flanges or walls arranged along the entire length of each of said sections, and said walls or flanges in any two adjacent sections abutting and meeting end to end, and thereby forming continuous compartments or chambers without a break in the top of the conduit, and continuous electrical conductors in said chambers arranged therein behind the said flanges and above the lowest parts thereof, whereby a direct and complete metallic circuit is established entirely within the continuous compartments or chambers in said conduit and through the entire length of the conduit, for the purposes set forth.

3. A conduit consisting of a base provided with continuous grooves therein, plates arranged in said grooves and formed at their tops in the shape of an inverted U, or nearly so, said plates being arranged end to end in said grooves in the base, and thus forming a continuous conduit having an open slot in the upper side thereof, as and for the purposes set forth.

4. A conduit consisting of a base provided with continuous grooves therein, braces arranged in said base, plates in said grooves and formed at the tops in the shape of an inverted U, or nearly so, said plates being arranged end to end in said grooves in the base, thus forming a continuous conduit having an open slot in the upper side thereof, and means for securing said plates or sides of the conduit to said braces and the base, as and for the purposes set forth.

5. A conduit consisting of a base provided with continuous grooves therein, braces arranged in said base, plates in said grooves formed at their tops in the shape of an inverted U, or nearly so, said plates being arranged end to end in said grooves, and thus forming a continuous conduit having an open slot in the upper side thereof, means—such as tie-bolt—for securing said plates or sides of the conduit to said braces in the base, and openings therein and sewer connections, as and for the purposes set forth.

6. A conduit consisting of oppositely-arranged plates or sections on a base-plate, braces arranged across said base-plate provided with outwardly and upwardly projecting arms or extensions having perforations or slots therein, and means for securing said plates or sections to the said arms, as and for the purposes set forth.

7. In a conduit, the combination of a base having grooves running parallel and in the direction of its length on said base, of adjoining plates arranged in said parallel grooves in the base, said plates being provided with a downwardly-projecting drip-opening, which forms a continuous open slot in the top of the conduit, and chambers or compartments in said conduit on both sides of said slot, as and for the purposes set forth.

8. The combination, in an open-topped or slotted conduit, of a base-plate provided with longitudinally-arranged grooves therein, braces in said base-plate having grooves therein arranged in such positions on the braces to form continuous grooves with those in the base-plate, sections arranged end to end in said grooves and bent at the top in the form of an inverted U, and means for securing said plates to the braces and to the base-plates, as and for the purposes set forth.

9. A conduit consisting of a base provided with continuous grooves therein, braces arranged at intervals in said base, plates or sections in said grooves and shaped at the tops in the form of an inverted U, or nearly so, said plates being arranged end to end in said grooves, thus forming an open-topped or slotted conduit, chambers or compartments within said conduit on each side of said slot formed by the tops of the said sections or plates, openings arranged at intervals in the top of said conduit on opposite sides of the slot and covers in said openings, as and for the purposes set forth.

10. A conduit consisting of a base provided with continuous grooves therein, braces arranged at intervals in said base, plates or sections in said grooves shaped at their tops in the form of an inverted U, or nearly so, said plates being arranged end to end in said grooves, thereby forming an open-topped or slotted conduit, chambers or compartments within said conduit on each side of said slot formed by the tops of said sections or plates, openings arranged at intervals in the top of said conduit on opposite sides of the slot, covers in said openings, and means connecting said plates with the braces arranged in the base to secure the same thereto, as and for the purposes set forth.

11. A conduit having a continuous open slot or top and provided with continuous compartments and chambers arranged in the top of the conduit on each side of said slot, said chambers being open at the bottom and provided with openings in the top at intervals on opposite sides of the slot, and covers in said openings, as and for the purposes set forth.

12. In a conduit, the combination, with a base-plate, of oppositely-arranged plates or sections on said base-plate in the direction of its length thereon, said plates meeting end to end and being provided with a downwardly-projecting drip-opening, which forms a continuous open slot in the top of the conduit, and open-bottomed chambers or compartments in said conduit on both sides of said slot, for the purposes set forth.

In testimony that I claim the invention set forth above I have hereunto set my hand this 24th day of September, 1889.

JOSEPH H. WEHRLE.

Witnesses:
HERBERT BOGGS,
FREDK. C. FRAENTZEL.